(12) United States Patent
Goudie

(10) Patent No.: US 6,898,649 B2
(45) Date of Patent: May 24, 2005

(54) ARBITER FOR QUEUE MANAGEMENT SYSTEM FOR ALLOCATING BUS MASTERSHIP AS A PERCENTAGE OF TOTAL BUS TIME

(75) Inventor: Alistair I. Goudie, Lincoln (GB)

(73) Assignee: Zarlink Semiconductor Limited, Wiltshire (GB)

(*) Notice: Subject to any disclaimer, the term of this patent is extended or adjusted under 35 U.S.C. 154(b) by 279 days.

(21) Appl. No.: 10/035,930

(22) Filed: Dec. 26, 2001

(65) Prior Publication Data

US 2002/0166007 A1 Nov. 7, 2002

(30) Foreign Application Priority Data

Dec. 29, 2000 (GB) .............................................. 0031763

(51) Int. Cl.[7] .............................................. G06F 3/00
(52) U.S. Cl. ...................... 710/112; 710/117; 710/107; 710/244; 710/52; 710/310; 710/45; 710/309
(58) Field of Search ................. 710/107–125, 710/240–244, 305–306, 309–310, 52, 39, 45, 110

(56) References Cited

U.S. PATENT DOCUMENTS

| | | | | |
|---|---|---|---|---|
| 4,969,120 A | * | 11/1990 | Azevedo et al. | 710/100 |
| 5,241,632 A | * | 8/1993 | O'Connell et al. | 710/240 |
| 5,463,624 A | * | 10/1995 | Hogg et al. | 370/461 |
| 5,485,586 A | * | 1/1996 | Brash et al. | 710/119 |
| 5,583,999 A | * | 12/1996 | Sato et al. | 710/301 |
| 5,784,569 A | * | 7/1998 | Miller et al. | 709/235 |
| 6,145,040 A | * | 11/2000 | LaBerge et al. | 710/107 |
| 6,363,445 B1 | * | 3/2002 | Jeddeloh | 710/113 |
| 6,385,678 B2 | * | 5/2002 | Jacobs et al. | 710/113 |

FOREIGN PATENT DOCUMENTS

| | | | | |
|---|---|---|---|---|
| EP | 0675445 A2 | * | 10/1995 | G06F/13/362 |
| WO | WO 94/09437 | * | 4/1994 | G06F/13/366 |
| WO | WO 98/12645 | * | 3/1998 | G06F/13/36 |

* cited by examiner

Primary Examiner—Tim Vo
Assistant Examiner—Raymond N. Phan
(74) Attorney, Agent, or Firm—Pearne & Gordon LLP (57) ABSTRACT

An arbiter (7) is provided for a QMS having multiple queue users (5A to 5D), each having real time requirements for mastership of a bus (31). The arbiter (7) is arranged so that the amount of time that each queue user (5A to 5D) can gain bus access is a percentage of the total bus time.

20 Claims, 5 Drawing Sheets

Fig. 3A Arbiter state machine

Fig. 3B

ARBITER FOR QUEUE MANAGEMENT SYSTEM FOR ALLOCATING BUS MASTERSHIP AS A PERCENTAGE OF TOTAL BUS TIME

CROSS-REFERENCES TO RELATED APPLICATIONS

This application claims the benefit of United Kingdom Patent Application No. 0031763.6 filed on Dec. 29, 2000.

FIELD OF THE INVENTION

This invention relates to an arbiter for a system containing multiple bus masters, and in particular to a bus arbiter in a queue management system (QMS) block in a Bluetooth baseband peripheral. The invention also relates to a QMS including such an arbiter.

BACKGROUND OF THE INVENTION

A bus arbiter for a QMS is used to decide bus mastership in a system having multiple masters each having real time requirements. A master with real time requirements is not likely to need to access the bus all the time, but it does need to be sure it can make a predetermined number of bus accesses within a given period. Known arbiter blocks have a fixed set of priority levels so that, if a high priority block requests mastership, it prevents bus access to all lower priority blocks. In some known systems, all the prioritisation levels are required to be shuffled, but this rarely leads to a situation that can guarantee bandwidth to multiple arbiter blocks.

SUMMARY OF THE INVENTION

The present invention provides an arbiter for a system having multiple bus masters each having real time requirements for mastership of a bus, wherein the arbiter is arranged so that the amount of time that each bus master can gain bus access is a percentage of the total bus time.

This ensures worse case conditions for bus access can be clearly defined, and will not be affected by adding or changing the functions of other bus masters. Consequently, bus access is evenly distributed, rather than occurring in bursts.

Preferably, the arbiter further comprises means for allocating priority levels for bus mastership when a given bus master does not request bus mastership during its allocated percentage of the total bus time.

The invention also provides a bus master each having real time requirements for mastership of the bus, and an arbiter for allocating bus mastership to the bus masters, wherein the arbiter is as defined above.

In a preferred embodiment, the system comprises a QMS, and each bus master is a queue user. In this case, the QMS may include a queue portal for each of the queue users, a respective queue user interface being positioned between each queue user and its portal.

Preferably, the QMS system further comprises a memory for holding data as it passes through the queues, and wherein one of the queue users is constituted by a processor.

Advantageously, the arbiter includes a state machine for allocating each bus master its predetermined percentage of bus time. Preferably, the state machine determines the active queue portal arbitration by cycling through a predetermined number of states, in a fixed order, or every clock cycle, each of the states being associated with a respective queue portal.

Conveniently, the percentage of total bus time allocated to a given queue portal is determined by the number of states associated with that queue portal.

In a preferred embodiment, the means for allocating priority levels for bus mastership is activated when the queue portal currently selected does not request bus mastership. Advantageously, the arbiter is such that the highest of said priority levels is allocated to non-interruptible memory sequences triggered by the processor, such that the next highest priority level is allocated to accesses to the bus by the processor, and such that the next highest priority level is allocated to accesses to the bus by the QMS.

The invention further provides a Bluetooth baseband peripheral comprising a QMS system, link control hardware for communication with Bluetooth devices via a radio IC and the QMS system, and a re-usable microprocessor block, wherein the QMS system is as defined above.

Advantageously, the peripheral further comprises an interface block between the bus and the re-usable microprocessor block.

Preferably, the queue users are a communication control block, a host queue user, a voice encoder and decoder, and a processor forming part of the re-usable microprocessor block. Conveniently, each of the queue users is connected to the bus via its queue user interface and a respective bus master and bus tri-state driver.

BRIEF DESCRIPTION OF THE DRAWINGS

The invention will now be described in greater detail, by way of example, with reference to the drawings in which.

DETAILED DESCRIPTION OF THE PREFERRED EMBODIMENTS

Figure 1:
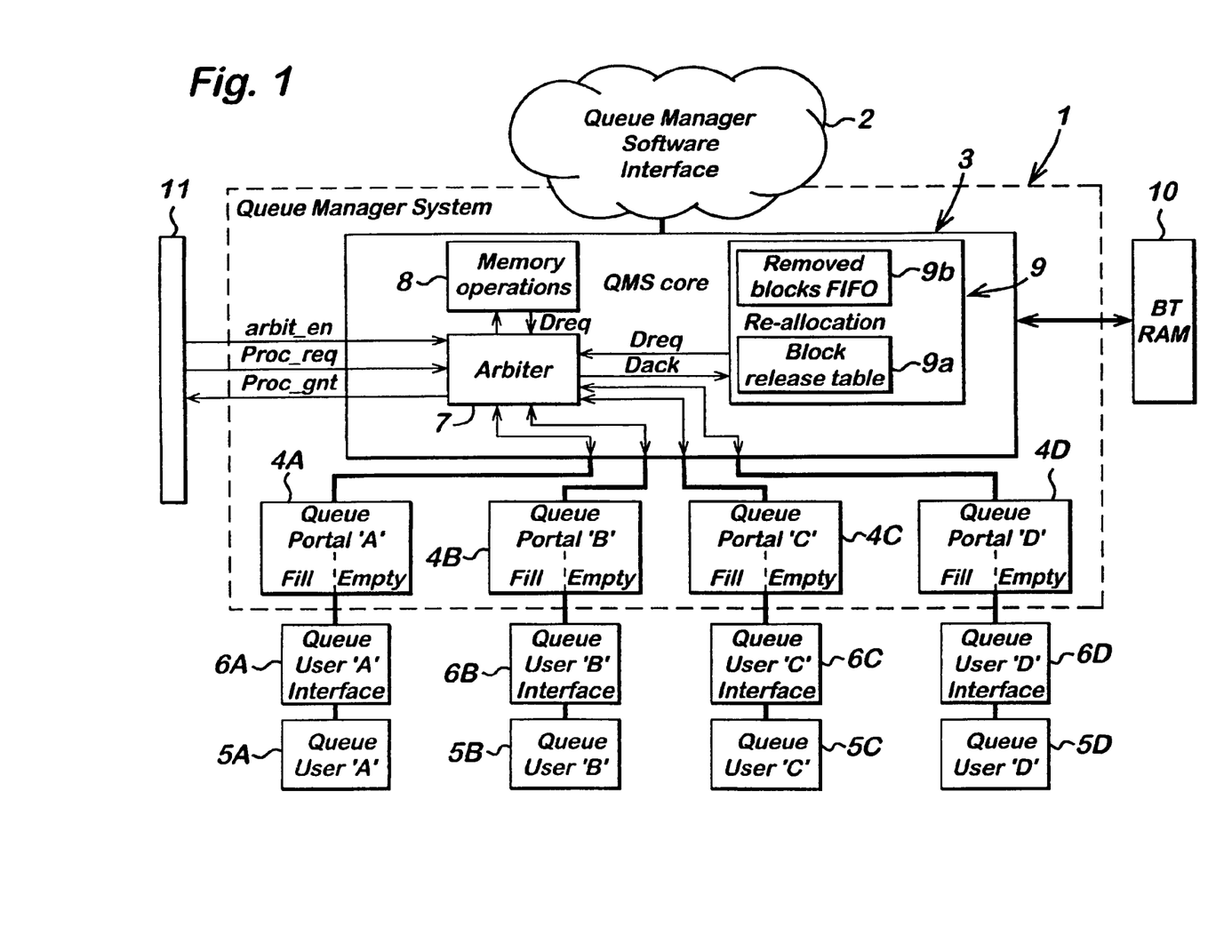
FIG. 1 shows the system architecture for a QMS.

Referring to the drawings, FIG. 1 shows a system architecture which includes a QMS, indicated by the dotted-line block 1, a queue manager software interface 2, a core (queue manager hardware) 3, and four identical queue portals 4A, 4B, 4C and 4D. The portals 4A to 4D are associated with respective queue users 5A to 5D by means of queue interfaces 6A to 6D. The queue users 5A to SD are external entities that accesses data stored in a queue. The core 3 includes an arbiter 7, a "memory operation" block 8, and a re-allocation block 9. The block 9 includes a block release table 9a and a removed blocks FIFO 9b, and communicates with a single port RAM 10. The arbiter 7 controls access to a bus 11 in a manner described below.

The QMS 1 uses the RAM 10 to hold data as it passes through the queues. The QMS 1 can support two types of queues, namely a synchronous queues (which are intended to hold 'good' data which can be held for an indeterminate amount of time), and isochronous queues (which are intended to hold a small amount of time-critical data). The mean data rates of the generator and consumer of data in an isochronous queue should be approximately the same. The data may be read/written in bursts, which is typically why the queue system is required. For isochronous queues, the QMS 1 splits the RAM 10 into memory blocks, which are linked together to form variable length FIFO queues. The QMS 1 can resize a queue (by adjusting the rules for adding memory blocks) as the storage requirement changes. For isochronous queues, a smaller area of contiguous memory is used.

As mentioned above, for each queue user 5A to 5D there is a dedicated generic queue portal 4A to 4D. A queue portal 4A to 4D can be used to access a number of queues, although it can only read/write to one queue at a time. A queue user 5A to 5D will indicate which queues it wants to access, and will then do a series of reads (or writes). The queue portal 4A to 4D will map the reads (or writes) into RAM accesses. Within a memory block, the data will be stored at sequential locations. At the end of a memory block, the relevant queue portal 4A to 4D will follow a link to the next memory block in a chain, and start accessing the new memory block. The queue user 5A to 5D will not be aware of the linking process (although it will introduce delays to some accesses).

The read (or write) operations automatically update memory pointers provided in the queue portals 4A to 4D. However, for a synchronous queues in which data is expected to be good, there may be a requirement to repeat a series of reads/writes (e.g. due to a requirement to re-transmit a packet, or due to an error in a received packet). Therefore, the queue portals 4A to 4D each has a commit/discard mechanism. As well as the current read/write pointer (which is updated every read/write), there is a second pointer which can identify the start of a data block. A "data block" is not the same thing as a memory block, being a series of consecutive reads/writes, which may be stored within a memory block, or in a number of memory blocks. If a queue user 5A to 5D decides a data block should be re-read/re-written, it can do a 'discard', which loads the last stored 'start of data block' pointer into the current pointer. If the queue user 5A to 5D decides a data block is good, it can do a 'commit' which loads the current pointer into the 'start of data block' pointer. When a queue user 5A to SD is writing to a queue, it will always decide to commit/discard before unloading the queue.

The QMS 1 also includes four flag bits that can indicate boundaries in the data flow. The flags are stored at the start of a memory block (they cannot identify a location within the block). If the most-significant bit (MSB) of the flags is set, the queue portal 4A to 4D will advance the current pointer to the start of the next memory block. New data will be stored in the new memory block, rather than filling the previous block first. The other flags will be used to identify boundaries over multiple MSB boundaries. The flags are not necessarily used at the same time as the commit/discard mechanism. The queue user 5A to 5D could decide to write several packets before 'committing' to them, or it could 'commit' to a fragment of a packet. The flags can be used to help with fragmentation and re-assembly of packets, and/or to identify packet headers stored with the data.

For isochronous queues, a simpler mechanism is required. The commit/discard mechanism and start of packet indication are not required. The isochronuous queues are intended to hold error tolerant, time-critical data (e.g. voice samples). The queue uses a simple FIFO approach (with pointers mapped to an area of the single port RAM 10). If the data generator fills the FIFO, it will advance both the generator and consumer pointers, so the oldest data in the FIFO is discarded. If the data consumer empties the FIFO, an error will be indicated, and the last data read from the FIFO will be repeated.

Figure 2A:
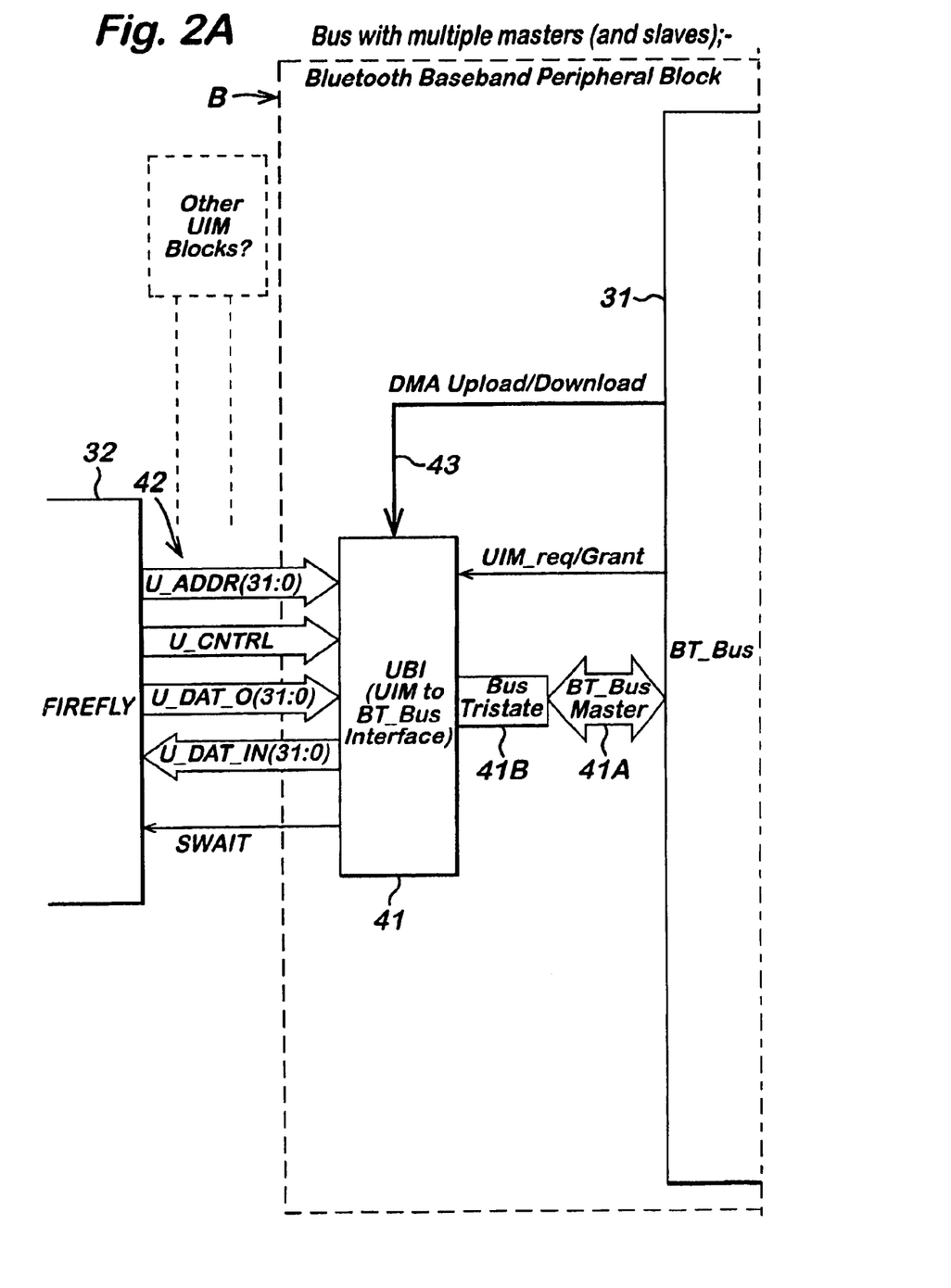
FIG. 2 shows the system architecture for a QMS which is used for a Bluetooth baseband peripheral.
Figure 2B:
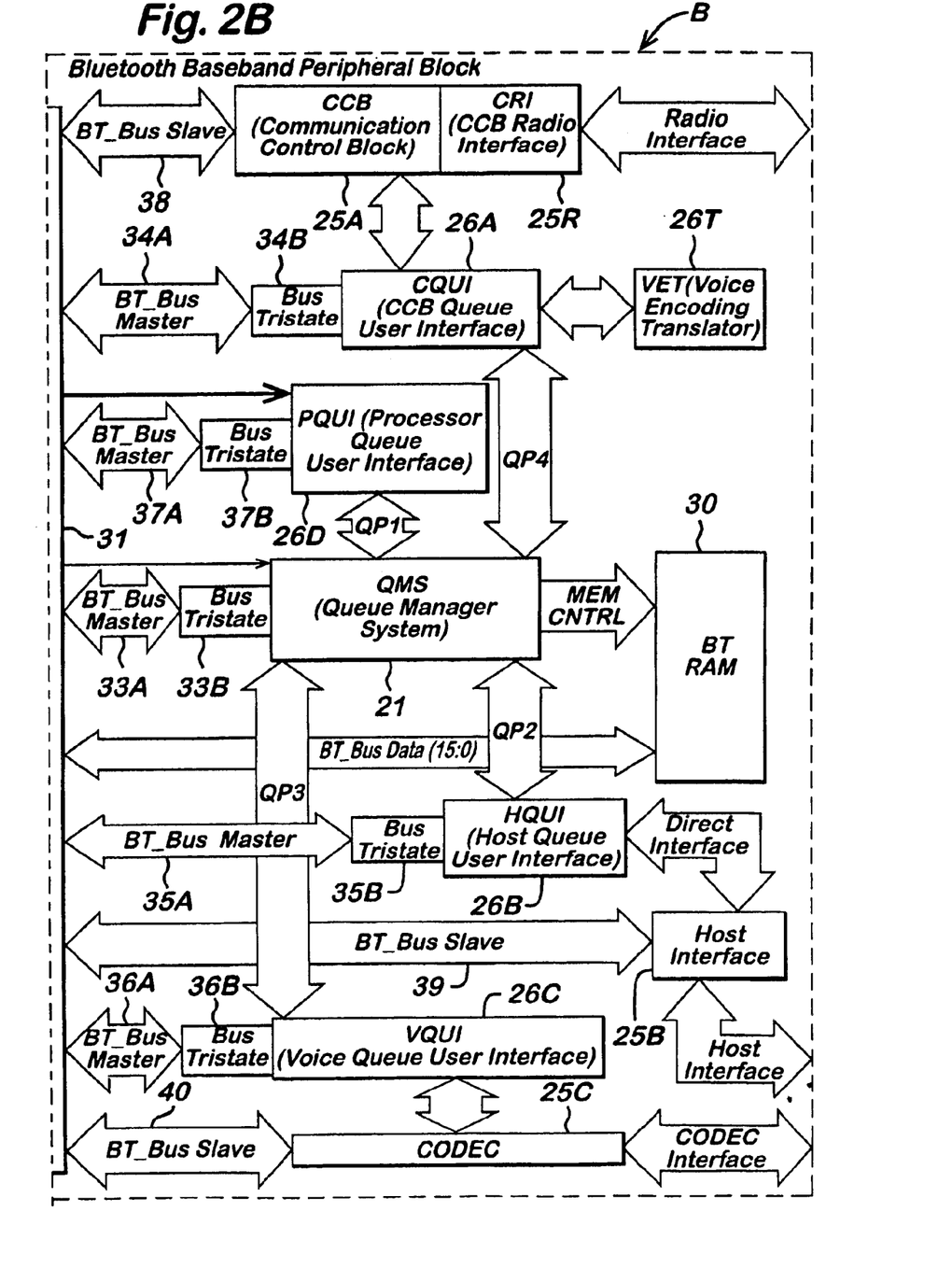

FIG. 2 shows the system architecture of a Bluetooth baseband peripheral (indicated by the dotted line B) which contains the hardware required to implement a Bluetooth baseband control. The peripheral is designed to work as a slave peripheral device that can interface to a 16-bit processor or a 32-bit processor (the block uses a 16-bit address and a 16-bit data bus). The peripheral block includes link control hardware required to communicate with other Bluetooth devices via a radio IC and a QMS 21. As with the embodiment of FIG. 1, the QMS 21 is controlled via a queue manager software interface (not shown). The QMS 21 is identical to the QMS 1 of FIG. 1, and so is not shown in detail in FIG. 2. Thus, the QMS 21 communicates with a single port RAM 30, and controls access to a bus 31. The bus 31 is associated with a "Firefly" block 32, which is a re-usable microprocessor block which consists of an ARM7TDMI processor and ancillary blocks including a memory/peripheral controller, and an interrupt controller and a UART.

The QMS 21 decides bus mastership for queue users 25A to 25D (only 25A to 25C of which are shown—the queue user 25D being constituted by the ARM7TDMI processor in the Firefly block 32), each of which has an associated user interface 26A to 26D. The queue user 25A is a communication control block (CCB), the queue user 25B is a host queue user (HOSTIF), the queue user 25C is a voice encoder and decoder (CODEC), and the queue user 25D is a processor. The queue portals associated with the interfaces 26A to 26D are not shown in FIG. 2, being part of the QMS 21.

The QMS 21 communicates with the bus 31 via a bus master 33A and a bus tri-state driver 33B. Similarly, the user interfaces 26A to 26D are connected to the bus 31 via respective bus masters 34A, 35A, 36A and 37A and respective bus tri-state drivers 34B, 35B, 36B and 37B. The queue user 25A is connected to the bus 31 by a bus slave 38, the queue user 25B is connected to the bus 31 by a bus slave 39, and the CODEC 25C is connected to the bus 31 by a bus slave 40. The bus 31 is connected to the Firefly block 32 via up-integration module (UIM) to a bus interface (UBI) block 41 by a UIM bus 42. The processor user interface 26D is connected to the block 41 by a direct memory access (DMA) upload/download connection 43 The block 41 isolates the UIM bus 42 from the bus 31. The block 41 is connected to the bus 31 by a bus master 41A and a bus tri-state driver 41B. The processor 25D accesses the peripheral block B by getting the UBI block 41 to request bus mastership.

The peripheral block B thus has three main parts, namely:

1. A link controller that interfaces to a radio, the link controller comprising the CCB 25A, the CCB queue user interface 26A, a CCB radio interface (CRI) 25R and a voile encoding translator (VET) 26T.
2. A buffer manager that stores data packets and allows processor interaction, the buffer manager comprising the UBI 41, the processor interface 26D, the QMS 21, and a block of the single port RAM 30.
3. A host interface that interfaces to an external host device (not shown), the host interface comprising the host queue user interface 26B, the host interface 25B (which may be a UART), the voice queue user interface 26C and the CODEC The arbiter 7 of the QMS 21 is responsible for determining which queue user 25A to 25D can access the bus 31, which in turn effects which user can access the RAM 32. An external 'arbit$_{13}$ en' input signal (see FIG. 1) acts as an enable to the arbiter 7. When enabled, the arbiter 7 includes the following priority levels.

| Priority | Function |
| --- | --- |
| Highest | Continuation of un-interruptible operation |
| — | Active queue portal (round robin approach to provide guaranteed bandwidth) |
| — | Processor initiated start of un-interruptible operation |
| — | Processor access to Bluetooth block |
| Lowest | Re-allocation function |

A state machine constituted by the arbiter 7 determines the 'active queue portal' arbitration. Every Clock cycle, the state machine 7 cycles through the states, in a fixed order. The only exception is non-interruptible sequences which make the state machine wait in its current state. This sequence is:

| State | Priority Queue Portal |
| --- | --- |
| 0 | The queue portal for the user 25D |
| 1 | The queue portal for the user 25B |
| 2 | The queue portal for the user 25D |
| 3 | The queue portal for the user 25B |
| 4 | The queue portal for the user 25D |
| 5 | The queue portal for the user 25B |
| 6 | The queue portal for the user 25A |
| 7 | The queue portal for the user 25B |
| 8 | The queue portal for the user 25D |
| 9 | The queue portal for the user 25B |
| 10 | The queue portal for the user 25C |
| 11 | The queue portal for the user 25B |
| 12 | The queue portal for the user 25D |
| 13 | The queue portal for the user 25B |
| 14 | The queue portal for the user 25A |
| 15 | The queue portal for the user 25B |

This system ensures a certain percentage of the bus bandwidth is available for each queue portal. The percentage of bus bandwidth allocated should be sufficient to meet the burst requirements of the queue portals, the HOSTIF 25B being allocated 50%, the processor 25D being allocated 31.25%, the CCB 25A being allocated 12.5%, and the CODEC 25C being allocated 6.25%. The queue portals should work with less than the allocated bandwidth, due to non-interruptible sequences that can temporarily increase the bandwidth used by other portals. (The implementation should allow these allocations to be changed easily.)

The arbiter 7 also includes an enable bit for each queue portal. The enable bit can be used to block requests for mastership (although this will not effect the sequence of the state machine).

If the queue portal currently selected by the state machine (arbiter) 7 does not request bus mastership, either because it has no data to transfer or it has been disabled, then one of the lower priority functions can be come b us master. The next level of priority is used for "non-interruptible memory sequences", which are triggered by the processor 25D. These operations involve reading from memory, and then modifying the contents of the memory based on what was read. Starting these operations is considered lower priority than queue portal operations (once started, they complete as non-interruptible operations which have the highest priority in the arbiter 7). However, the processor 25D assumes that, once it triggers a non-interruptible memory sequence, by the next time the processor accesses the memory, the non-interruptible memory sequence will be complete. Therefore, non-interruptible memory sequences have to be higher priority than the processor 25D. The next level of priority is the processor 25D accesses to the UBI block 41. The processor 25D is treated as being lower priority than the queue portals so that the bandwidth available to the queue portals can be guaranteed. If the processor 25D attempts to become bus master while a higher priority function is using the bus 31, the processor is held in a wait state. This adds some uncertainty to the speed at which software remaining on the processor 25D will operate, but this is taken into account when writing the software. The processor 25D should not be held up by low priority functions, and so needs to have a higher priority than these other non-time-critical functions. (In addition, the processor 25D can modify a control bit in the UBI block 41 which disables the normal arbiter 7, and makes the UBI block the bus master, thereby making the processor the highest priority bus master. However, this bit is not used in normal operation.) If no other function is requesting to be bus master, the QMS 21 becomes bus master, and can use the 'spare' bus cycles to do low priority accesses, such as block re-allocation.

Figure 3A:
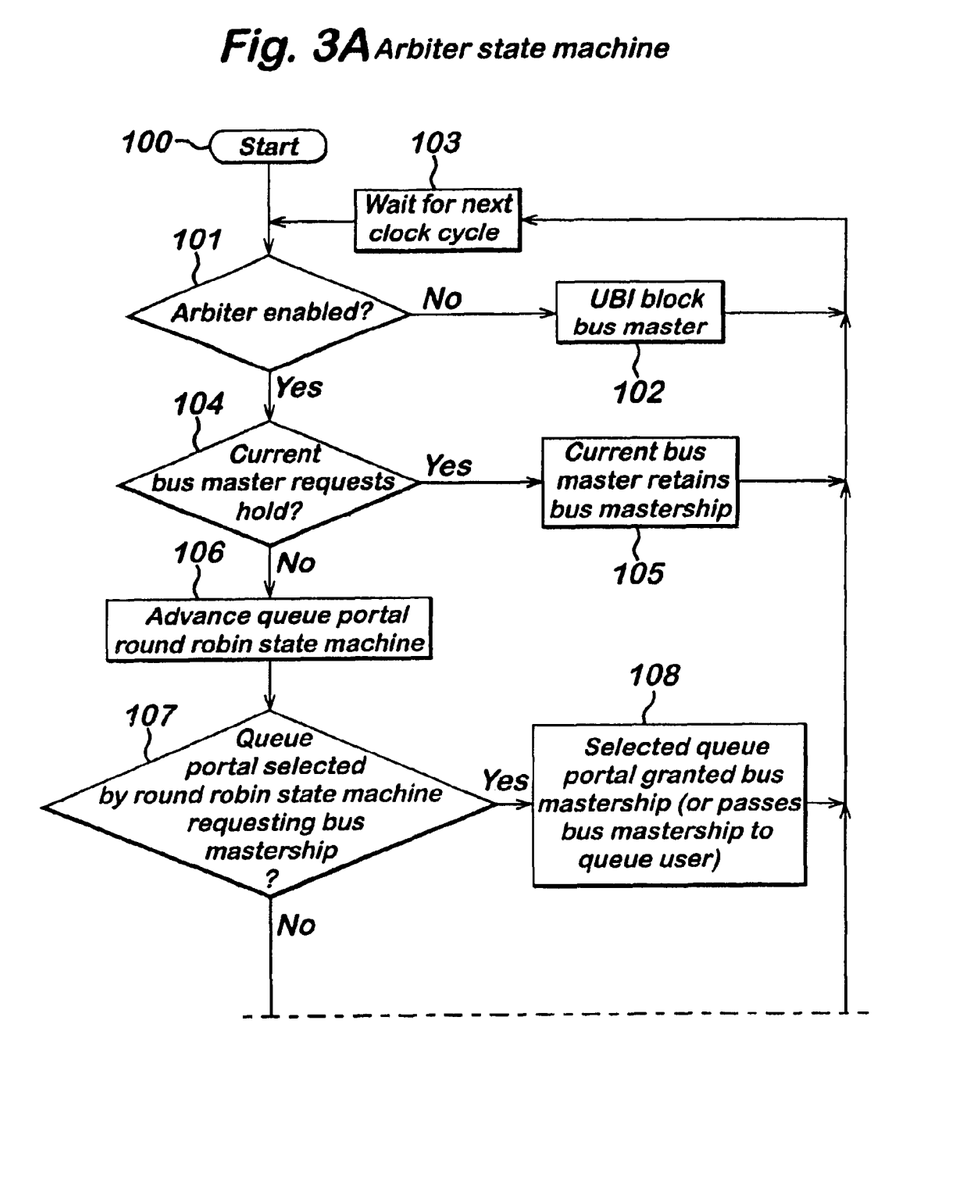
FIG. 3 is a flow diagram illustrating the decision processes of a state machine forming part of the architecture of FIG. 2.
Figure 3B:
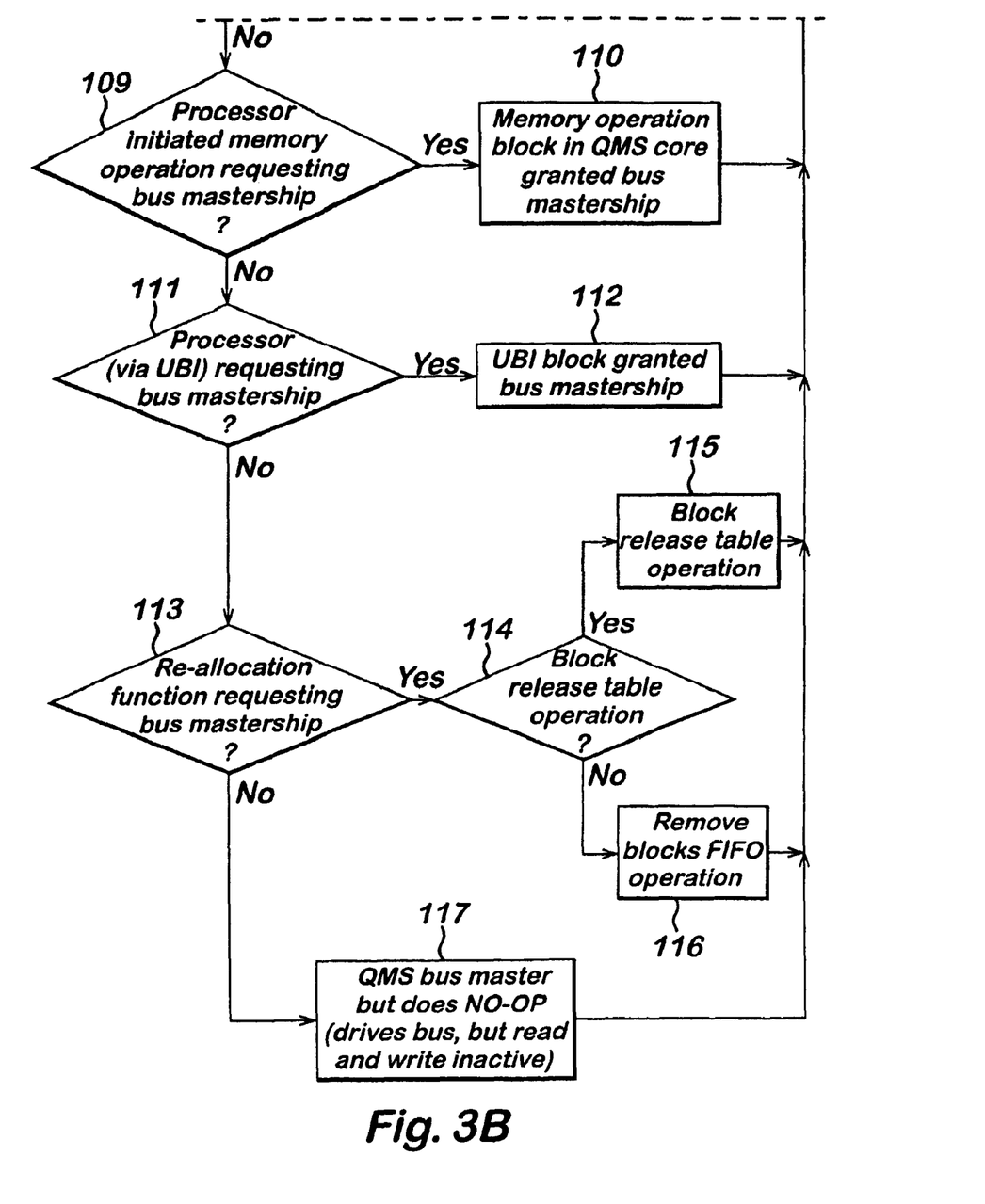

FIG. 3 is a flow chart illustrating the decision processes of the arbiter 7. The processes start at step 100, and, in step 101 the arbiter 7 checks to see if it is enabled. If not, the block 40 has bus mastership (step 102), and the arbiter proceeds to step 103 to wait for the next clock cycle, at which stage step 101 is repeated.

If the arbiter 7 is enabled, step 104 queries whether the current bus master requests retention of mastership. If so, that bus master is granted retention of bus mastership (in step 105), and the arbiter 7 then returns to step 103 to wait for the next clock cycle. If the current bus master did not request retention of mastership, the arbiter 7 proceeds to step 106, where the queue portal is advanced in round robin fashion. If the queue portal selected in this manner requests bus mastership step (107), the selected queue portal is granted bus mastership (or passes mastership to the associated queue user)—in step 108. The programme then returns to step 103 to wait for the next clock cycle.

If the queue portal selected does not request bus mastership, the QMS core is asked whether a processor initiated memory operation has requested bus mastership (step 109). If the answer to this question is yes, a memory operation block in the QMS core is granted bus mastership (step 110), and the arbiter 7 then returns to step 103 to wait for the next clock cycle. If a processor initiated memory operation has not requested bus mastership, a check is made (step 111) to see whether the processor 25D has requested a bus mastership via the block 41. If such a request has been made, the block 41 is granted bus mastership (step 112) and the arbiter 7 returns to step 103 to wait for the next clock cycle.

If the processor 25D did not request bus mastership via the block 41, a check is then made (step 113) to see whether the re-allocation block 9 has requested bus mastership. If it has, a check is made to see whether there has been a block release table operation (step 114). If a block release table operation is required, this is carried out in step 115; and, if not, the blocks are removed from the FIFO 9b (step 116). In either case, the arbiter 7 then returns to step 103 to wait for the next clock cycle. If the re-allocation block 9 has not requested bus mastership the QMS 21 is given bus mastership (step 117), after which the arbiter 7 returns to step 103 to wait for the next clock cycle. In step 117, at all times there must be one (and only one) bus master. Hence, if no other block wants to be bus master, the QMS block 21 must be the bus master. However, the QMS 21 doesn't want to have anything to do with the bus 31, so it drives the address and control signals of the bus into a state where it is not actively reading/writing to any blocks.

It will be apparent that modifications would be made to the arbiter described above. Thus, the version of the arbiter described above includes a 'hold' signal to allow a block to do an un-interruptible read-modify-write cycle. Unfortunately, this re-introduces some uncertainty into the number of bus cycles allocated (because the 'hold' cycles are not counted). If this becomes a problem, the arbiter could take account of 'hold' cycles when allocating future bus access (e.g. if a block introduces a hold cycle, the next time the arbiter is going to allocate bus mastership to the block, it could skip it).

The arbiter described above uses a state machine with sixteen states. If a finer solution in the allocation of bus mastership is required, either more states could be introduced, or a numerical algorithm could be used. The arbiter described above could be used with any system that needs to control access to a resource (usually a bus). Its greatest strength is defining the percentage of time that a unit can access a resource. This gives much more certainty to defining the design requirements of a block accessing the resource, and any given block doesn't have to worry about that other blocks accessing the resource do. This is to be contrasted with known systems with a prioritised access, where changes to a high priority block could affect the behaviour of a lower priority block).

What is claimed is:

1. A system comprising:
    a bus;
    a plurality of bus masters each having real-time requirements for mastership of the bus;
    an arbiter for allocating bus mastership to the bus masters, the arbiter being arranged so that the amount of time that each bus master can gain bus access is a percentage of the total bus time, and
    prioritization means for allocating priority levels for bus mastership when a given bus master does not request bus mastership during its allocated percentage of time.

2. A Queue Management System (QMS) supporting a plurality of queue users using a bus, each queue user being a bus master having real-time requirements for mastership of the bus, said QMS system comprising:
    an arbiter for allocating mastership of the bus to a given bus master, said mastership allocated as a percentage of the total bus time; and
    means for allocating priority levels for bus mastership when the given bus does not require bus mastership during its allocated percentage of the total bus time.

3. The QMS system according to claim 2, further comprising a queue portal for each of the queue users, a respective queue user interface being positioned between each queue user and its corresponding queue portal.

4. The QMS system according to claim 3, said QMS further comprising a memory for storing data as said data passes through said QMS; wherein one of the queue users is a processor.

5. The QMS system according to claim 2, said arbiter further including a state machine for allocating to each bus master its percentage of the total bus time.

6. The QMS system according to claim 4, said arbiter further including a state machine for allocating to each bus master its percentage of the total bus time.

7. The QMS system according to claim 5, wherein said state machine determines an active queue portal arbitration by cycling through a predetermined number of states, in a fixed order or every clock cycle, each of said states being associated with a respective queue user.

8. The QMS system according to claim 6, wherein said state machine determines an active queue portal arbitration by cycling through a predetermined number of states, in a fixed order or every clock cycle, each of said states being associated with a respective queue portal.

9. The QMS system according to claim 7, wherein said percentage of total bus time allocated to a given queue user is determined by a total number of states associated with the given queue user.

10. The QMS system according to claim 8, wherein said percentage of total bus time allocated to a given queue user is determined by a total number of states associated with a given queue portal corresponding to said given queue user.

11. The QMS system according to claim 10, wherein, when a given state is active and the given queue user corresponding to said given queue portal associated with said given state does not request bus mastership, then said means for allocating priority levels for bus mastership is activated.

12. The QMS system according to claim 11, wherein said arbiter allocates the highest priority level to bus accesses by a non-interruptible memory sequence triggered by the processor.

13. The QMS system according to claim 12, wherein said arbiter allocates a second highest priority level to bus accesses by the processor.

14. The QMS system according to claim 13, wherein said arbiter allocates a third highest priority level to bus accesses by said QMS.

15. The QMS system according to claim 9, wherein, when a given state is active and the given queue user associated with said given state does not request bus mastership, then said means for allocating priority levels for bus mastership is activated.

16. A Queue Management System (QMS) supporting a plurality of queue users using a bus, each queue user being a bus master having requirements for mastership of the bus, said QMS system comprising:
    a plurality of queue portals, each queue user being associated with a corresponding queue portal; and
    an arbiter including:
    means for allocating bus mastership to a given queue user as a percentage of total bus time, said means for allocating bus mastership having a state machine,
    wherein said state machine cycles through a predetermined number of states, each of said states being associated with a corresponding queue portal and thus also being associated with a corresponding queue user associated with said corresponding queue portal, and further
    wherein, when a given state is active, the corresponding queue user associated with said corresponding queue portal associated with said given state is allocated bus mastership, and still further
    wherein said percentage of total bus time allocated to said given queue user is determined by the total number of states associated therewith as compared to the total number of states; and
    means for allocating priority levels for bus mastership which is activated when the queue user associated with a specific state does not request bus mastership when said specific state is active.

17. A Bluetooth baseband peripheral comprising:
a QMS system according to one of claims 2, 3–16;
a re-usable microprocessor block;
link control hardware for communication with Bluetooth devices via a radio IC and a QMS system; and
an interface block between the bus and said re-usable microprocessor block,
the queue users comprising:
a communication control block;
a host queue user;
a voice encoder/decoder; and
a processor forming part of said re-usable microprocessor block,
wherein each of said queue users is connected to the bus via its queue user interface and a respective bus master and bus tri-state driver.

18. A Bluetooth baseband peripheral comprising:
a QMS system according to one of claims 2, 10, 11, 14, 9, 15, and 16;
a re-usable microprocessor block;
link control hardware for communication with Bluetooth devices via a radio IC and a QMS system; and
an interface block between the bus and said re-usable microprocessor block.

19. The Bluetooth baseband peripheral according to claim 18, wherein the queue users is one or more of a communication control block, a host queue user, a voice encoder/decoder, and a processor forming part of said re-usable microprocessor block, and further
wherein each of said queue users is connected to the bus via its queue user interface and a respective bus master and bus tri-state driver.

20. A Bluetooth baseband peripheral comprising:
a QMS system according to one of claims 2, 11, 15, and 16; and
link control hardware for communication with Bluetooth devices via a radio IC and a QMS system.

* * * * *

UNITED STATES PATENT AND TRADEMARK OFFICE
CERTIFICATE OF CORRECTION

PATENT NO. : 6,898,649 B2
DATED : May 24, 2005
INVENTOR(S) : Goudie

It is certified that error appears in the above-identified patent and that said Letters Patent is hereby corrected as shown below:

Column 2,
Line 57, please delete "a synchronous" and insert therefor -- asynchronous --.

Column 3,
Line 20, please delete "a synchronous" and insert therefor -- asynchronous --.
Line 35, after "5A to" please delete "SD" and insert therefor -- 5D --.

Column 4,
Line 61, after "CODEC" please insert -- 25C. --.
Line 65, please delete "'arbit$_{13}$en'" and insert therefor -- 'arbit_en' --.

Column 5,
Line 13, please delete "Clock" and insert therefor -- clock --.
Line 55, please delete "be come b us" and insert therefor -- become bus --.

Signed and Sealed this

Twenty-fifth Day of October, 2005

JON W. DUDAS
*Director of the United States Patent and Trademark Office*